(12) United States Patent
Liu et al.

(10) Patent No.: US 11,354,312 B2
(45) Date of Patent: Jun. 7, 2022

(54) ACCESS-PLAN-BASED QUERYING FOR FEDERATED DATABASE-MANAGEMENT SYSTEMS

(71) Applicant: INTERNATIONAL BUSINESS MACHINES CORPORATION, Armonk, NY (US)

(72) Inventors: Chang Sheng Liu, Beijing (CN); Yan Li Xu, Beijing (CN); Hui Guo, Beijing (CN); Yao M. Wang, Beijing (CN); Hai Jun Shen, Beijing (CN); Ping Liu, Beijing (CN)

(73) Assignee: International Business Machines Corporation, Armonk, NY (US)

(*) Notice: Subject to any disclaimer, the term of this patent is extended or adjusted under 35 U.S.C. 154(b) by 92 days.

(21) Appl. No.: 16/554,698

(22) Filed: Aug. 29, 2019

(65) Prior Publication Data
US 2021/0064618 A1 Mar. 4, 2021

(51) Int. Cl.
*G06F 16/2453* (2019.01)
*G06F 16/2452* (2019.01)
*G06F 16/25* (2019.01)

(52) U.S. Cl.
CPC .. *G06F 16/24542* (2019.01); *G06F 16/24524* (2019.01); *G06F 16/256* (2019.01)

(58) Field of Classification Search
CPC ............. G06F 16/2471; G06F 16/2452; G06F 16/24542; G06F 16/24524; G06F 16/256
See application file for complete search history.

(56) References Cited

U.S. PATENT DOCUMENTS

| | | | | |
|---|---|---|---|---|
| 5,943,666 A | * | 8/1999 | Kleewein | G06F 16/24542 |
| 6,615,203 B1 | * | 9/2003 | Lin | G06F 16/24542 |
| 7,890,496 B2 | | 2/2011 | Li | |
| 7,984,043 B1 | * | 7/2011 | Waas | G06F 16/8358 |
| | | | | 707/718 |
| 9,563,673 B2 | | 2/2017 | Jin | |
| 11,010,776 B1 | * | 5/2021 | Loginov | G06F 16/14 |

(Continued)

OTHER PUBLICATIONS

J. Sidell, "The Maripose Distributed Database Management System", 1996, SIGMOD. (Year: 1996).*

(Continued)

*Primary Examiner* — Etienne P Leroux
(74) *Attorney, Agent, or Firm* — Schmeiser, Olsen & Watts; Stephanie Carusillo (57) ABSTRACT

A federated database-management system receives an SQL query or other type of data-access request. The federated system's host DBMS parses, rewrites, and optimizes the request into an optimal data-access plan, then determines which portions of the plan require access to data stored on the federated systems' remote databases. The federated host partitions the plan into subplans that each represent instructions of the original data-access request that were directed to a corresponding remote database of the federated DBMS. Each subplan is then transmitted to its corresponding remote database, which directly executes the subplan and returns results to the host. If necessary, a subplan is translated from an original generic access-plan format into a database-specific format required by its corresponding remote database.

13 Claims, 6 Drawing Sheets

(56) References Cited

U.S. PATENT DOCUMENTS

| | | | | |
|---|---|---|---|---|
| 2005/0132383 | A1* | 6/2005 | Ghosh | G06F 16/24532 |
| | | | | 719/312 |
| 2005/0216896 | A1* | 9/2005 | Doleh | G06F 9/541 |
| | | | | 717/136 |
| 2006/0004696 | A1* | 1/2006 | Day | G06F 16/2454 |
| 2008/0033914 | A1* | 2/2008 | Cherniack | G06F 16/283 |
| 2009/0234799 | A1 | 9/2009 | Betawadkar-Norwood | |
| 2010/0058331 | A1* | 3/2010 | Berg | G06F 8/60 |
| | | | | 717/177 |
| 2010/0174736 | A1* | 7/2010 | Goodall | G06F 16/951 |
| | | | | 707/769 |
| 2010/0306188 | A1 | 12/2010 | Cunningham | |
| 2011/0153350 | A1* | 6/2011 | Simons-Nikolova | |
| | | | | G16H 40/67 |
| | | | | 705/2 |
| 2013/0006999 | A1* | 1/2013 | Wojtowicz | G06F 16/2471 |
| | | | | 707/741 |
| 2016/0078090 | A1* | 3/2016 | Shankar | G06F 16/24544 |
| | | | | 707/718 |
| 2016/0371269 | A1* | 12/2016 | Pereira | G06F 16/435 |
| 2018/0268030 | A1* | 9/2018 | Liu | G06F 16/2255 |
| 2018/0293275 | A1* | 10/2018 | P | G06F 16/258 |
| 2020/0034459 | A1* | 1/2020 | Rabe | G06F 16/273 |

OTHER PUBLICATIONS

Lawson, Christopher; Oracle Performance Tuning: Use SQL Profile to Transfer Optimizer Execution Plan to Another Database; Bassocantor Reviews; Apr. 28, 2018; 13 pages.

Mell, Peter et al.; "The NIST Definition of Cloud Computing;" National Institute of Standards and Technology; Special Publication 800-145; Sep. 2011; 7 pages.

* cited by examiner

ACCESS-PLAN-BASED QUERYING FOR FEDERATED DATABASE-MANAGEMENT SYSTEMS

BACKGROUND

The present invention relates in general to federated database-management systems (FDBMS) and in particular to an improved method of processing data-access requests submitted to a FDBMS.

A federated database is a set of distinct databases that may each be located at a different site. These distinct databases appear to be a single "federated" database to users who access the federated database through a federated "host" user interface.

When a user or upstream system attempts to query or otherwise access data stored in one or more of the distinct databases, the federated host initially processes the request much as would any other database-management system. The request's original data-access language is parsed into tokens or other meaningful objects; rewritten to reduce redundancies, duplicate data-accesses, and other inefficiencies; and then converted into an optimized data-access plan. The access plan contains detailed instructions that tell the federated database-management system which steps should be taken to most efficiently service the original access request.

If part of the original request attempts to access data stored on one of the federation's remote databases, the host interface translates that part of the access plan into an access subrequest written in a data-access language compatible with the remote database. The host then forwards the subrequest to the remote database, which again parses, rewrites, and optimizes the subrequest into an access subplan that is compatible with the remote database. The remote database executes the subplan as though the subplan had been directly submitted by a user to the remote database.

SUMMARY

Embodiments of the present invention comprise systems, methods, and computer program products for a federated database-management system (FDBMS) that processes queries by distributing access subplans to the system's remote databases. The federated database-management system receives an SQL query or other type of data-access request. The host DBMS of the FDBMS parses, rewrites, and optimizes the data-access request into an optimal data-access plan, then determines which portions of the plan require access to data stored on each of the federated system's remote databases. The federated host partitions the plan into subplans that each represent instructions of the original access request that require access to a particular remote database. Each subplan is then transferred to its corresponding remote database, which directly executes the subplan and returns a result to the host. If necessary, a subplan is translated from an original, generic format into a database-specific access-plan format required by its corresponding remote database.

DETAILED DESCRIPTION

Embodiments of the present invention include methods, systems, and computer program products that implement an improved federated database-management system (FDBMS). These embodiments provide benefits over a legacy FDBMS by reducing the number of steps required to process an incoming data-access request.

Examples and embodiments described in this document refer to an FDMBS that comprises relational database-management systems and to data-access requests that consist of SQL (Structured Query Language) queries. These examples and embodiments should not be construed to limit embodiments of the present invention to relational databases or to SQL queries. The present invention is flexible enough to accommodate embodiments that comprise any sort of federated or distributed database or data repository capable of being accessed by a user, and that processes access requests through a mechanism like that described in FIG. 4. The present invention is flexible enough to accommodate embodiments that comprise any sort of data-access request made upon such a data repository, so long as that request is capable of being processed by the method of FIG. 6.

Known FDBMS systems process a data-access request, such as a SQL query, by first performing a series of steps that translate the query into a detailed data-access plan. Upon determining that a portion of the access plan requires access to a remote database of the federated database, the federated host translates that portion into a new data-access subrequest, and transmits the subrequest to the remote database. The remote database then repeats the previous steps, translating the subrequest into a subplan that conforms to a format compatible with the remote database.

This procedure is inefficient because it requires the resource-intensive task of translating a query into a data-access plan to be performed both by the host federated system and by each remote database. Embodiments of the present invention improve upon this technology by instead configuring the host to divide the overall access plan into subplans and then transferring the subplans, not reconstituted access subrequests, to the remote databases. In addition to eliminating the step by which the host must translate the access plan into subrequests, this improvement allows receiving databases to execute subplans directly, without requiring a second query-to-access-plan translation.

An additional benefit of the present invention is provided by the step of forwarding data-access subplans, rather than reconstituted subqueries, to remote databases. In known FDBMS 4000, the host may lose important information when translating only a portion of an access plan into a particular remote database's subquery. For example, portions of the original access plan omitted from the subquery may contain useful information and steps that would have allowed the remote database to translate the subquery into a more efficient subplan. This lost information might include an index scan that would have allowed the FDBMS to better determine an optimal JOIN order or to identify how a database table is populated. Embodiments of the present invention, on the other hand, have access to the entire access plan, comprising all functionality of the original user query, when generating each subplan. This allows the federated host database to more consistently produce better-performing subplans.

Yet another benefit of the present invention is that an embodiment may be added to many legacy federated DBMS without requiring a complete rewrite of the legacy FDBMS. Existing FDBMS host modules for parsing, rewriting, and optimizing a query, and existing remote-database modules for executing an access plan, may be reused. Also, if legacy code does not already exist for translating a generic access subplan received from the host into a format compatible with a remote database, such a translation function may be implemented as an external service that can be called by a script, query processor, or other resource that manages the query process.

In some embodiments, some of the remote databases may require access-plans to conform to a database-specific format or data structure. In such cases, the embodiment may further include an access-plan format-translation engine (shown as item 530 in FIG. 5). In some embodiments, such a translation engine 530, configured to translate received access plans into a format compatible with a particular database, may be implemented as a component or extrinsic utility of that remote database, and may be located in proximity to that database.

In other embodiments, translation functionality may be built into the federated host system or may be implemented as a network resource or remote service available to the federated host system. In such cases, each subplan generated by the host is translated into a remote-database-specific format prior to transmitting the subplan to the remote database.

Figure 4:
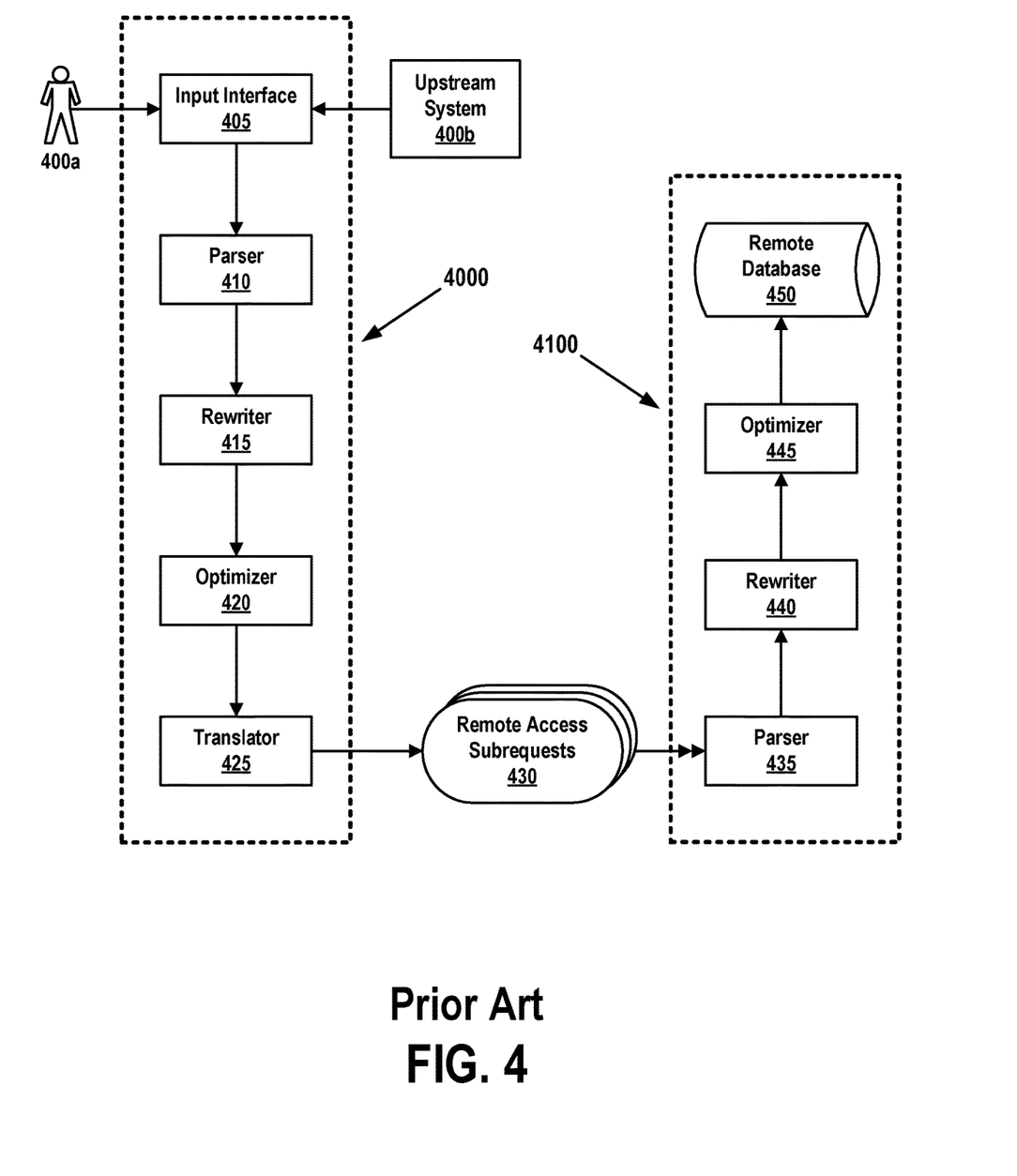
FIG. 4 shows the workflow by which a legacy federated database-management system processes a data-access request.
Figure 5:
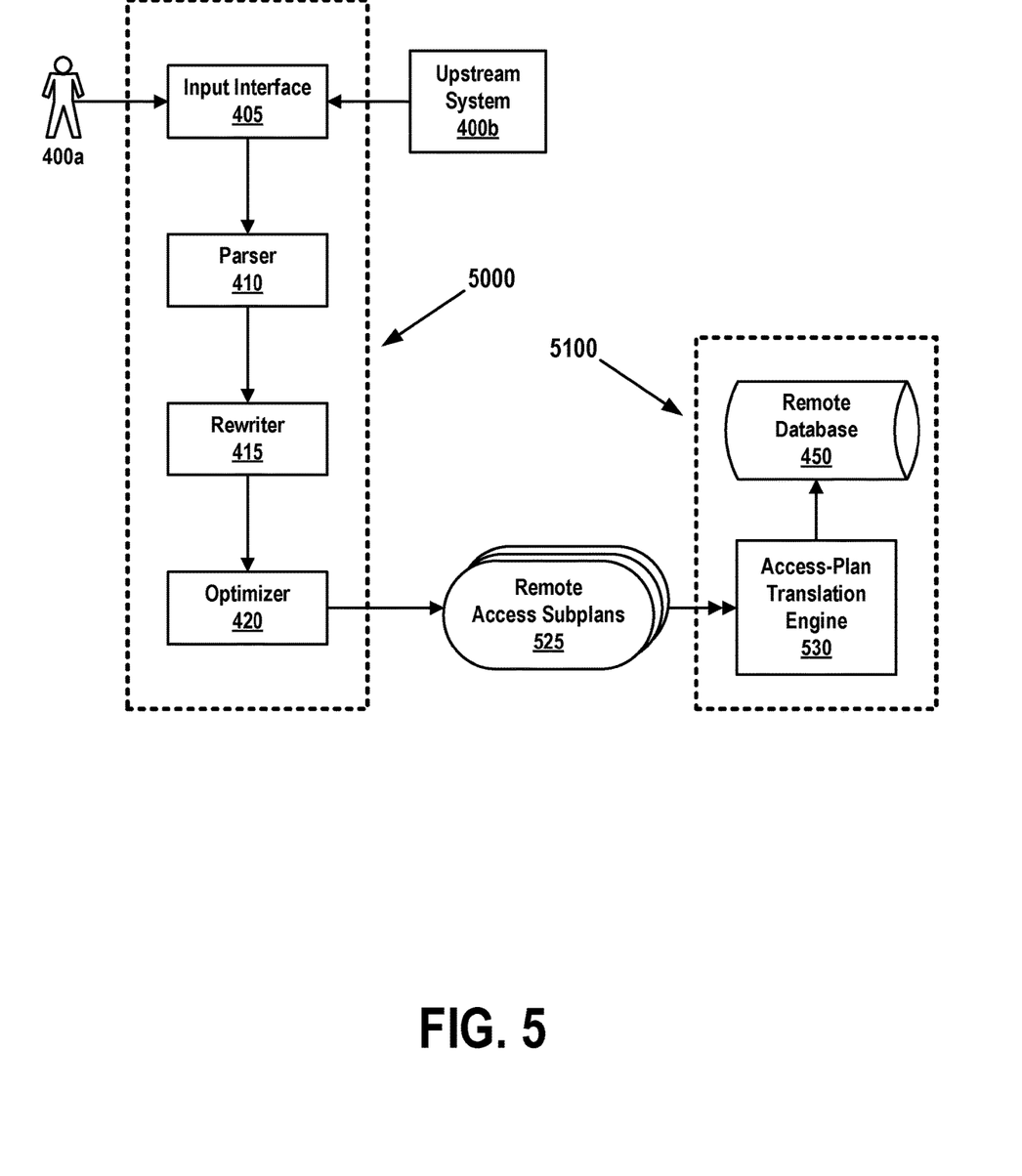
FIG. 5 shows the workflow by which an improved federated database-management system processes a data-access request, in accordance with embodiments of the present invention.
Figure 6:
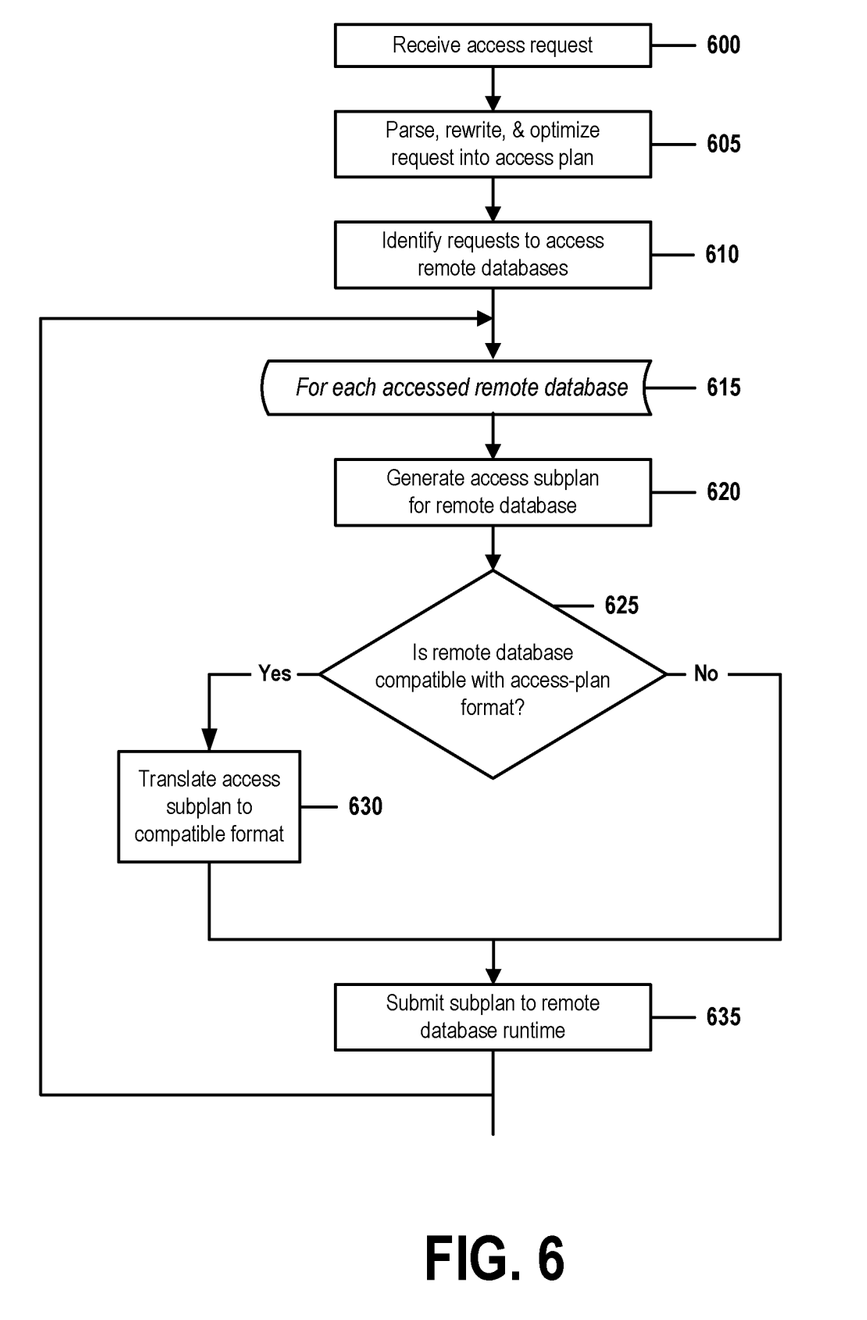
FIG. 6 is a flow chart that illustrates the steps of a method for access-plan-based querying for federated database-management systems in accordance with embodiments of the present invention.

FIG. 4 shows a workflow that illustrates the manner in which known FDBMS process queries and other data-access requests. FIG. 5 shows how embodiments of the present invention simplify such workflows. FIG. 6 is a flow chart that illustrates the steps by which embodiments perform this task.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
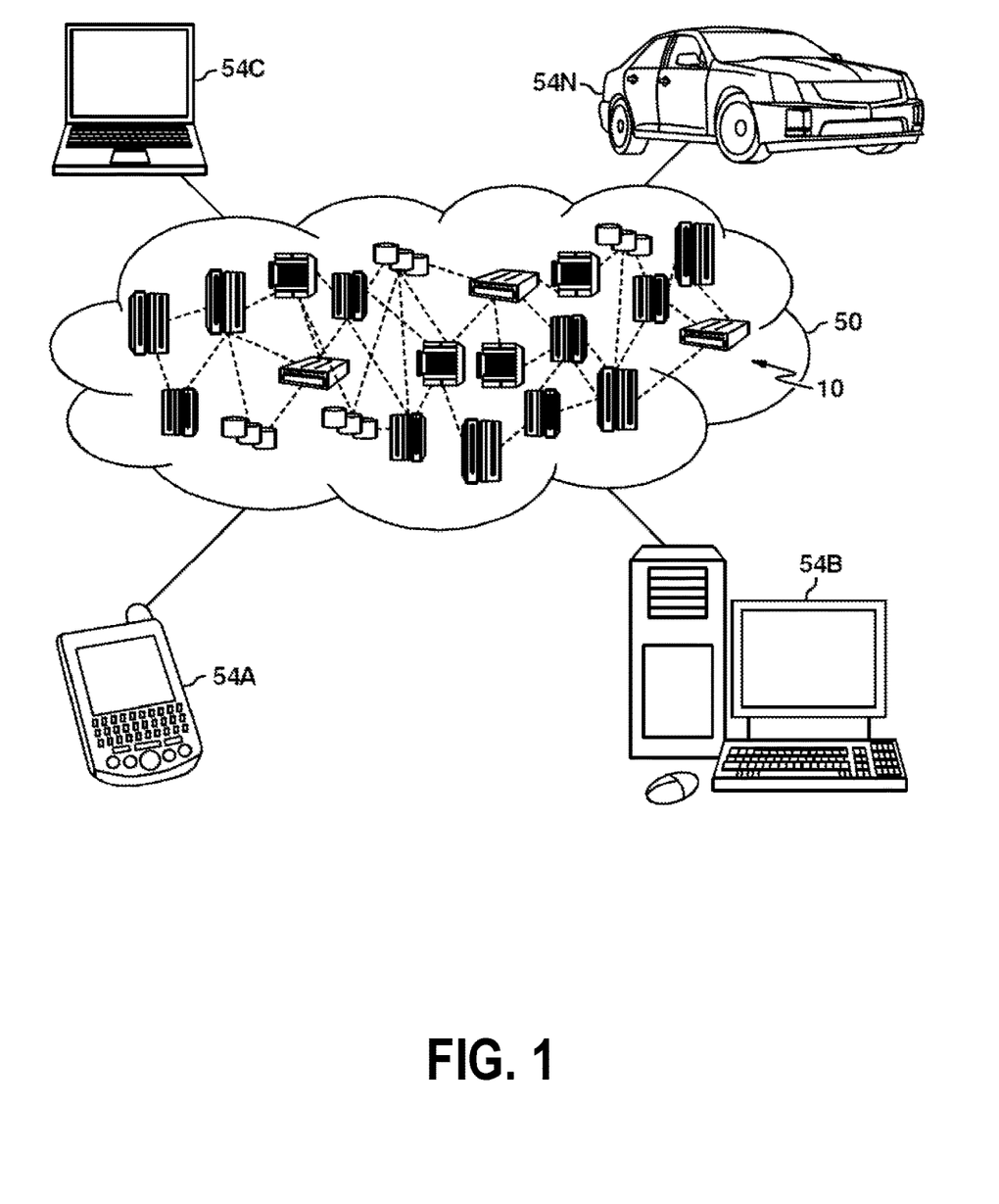
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
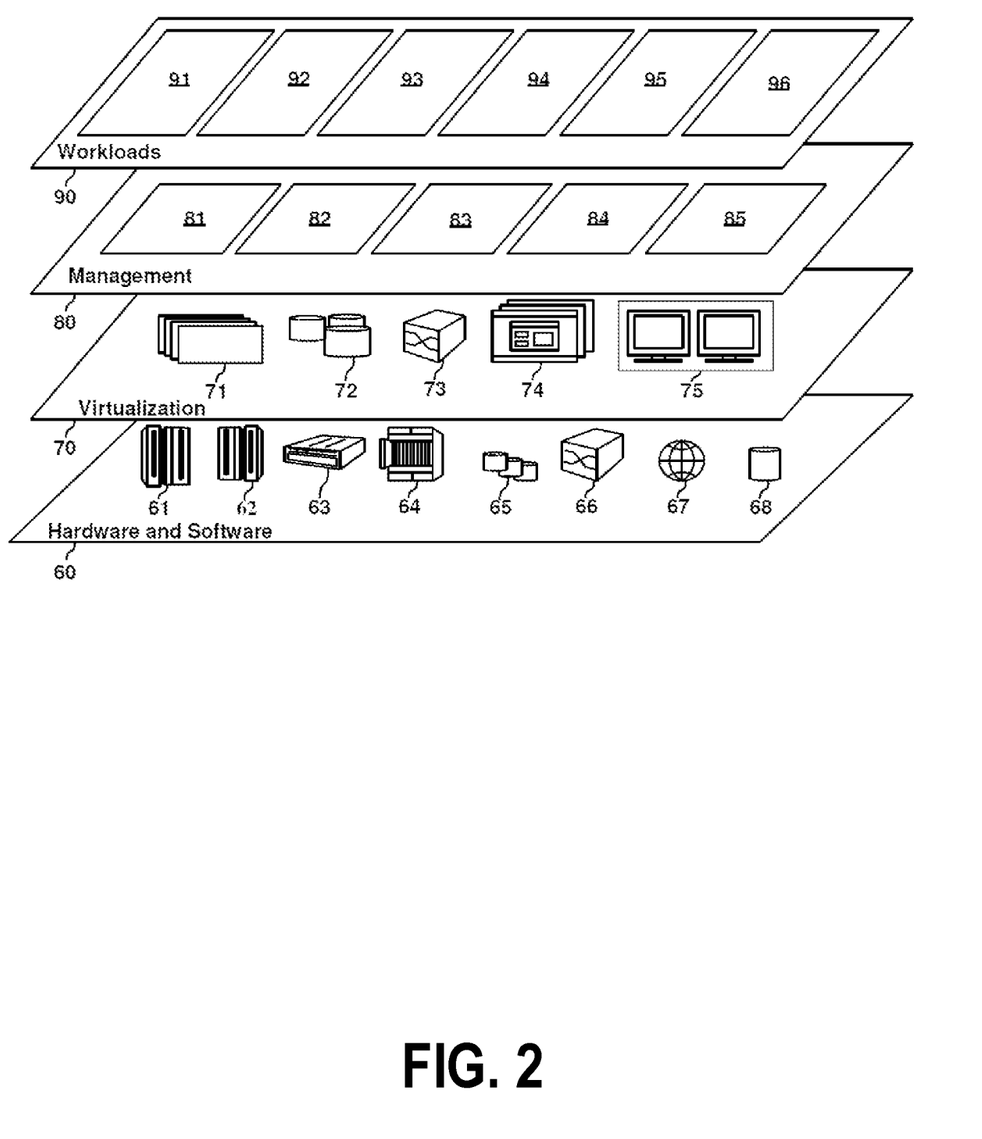
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of complex tasks related to a federated database with distributed access plans 96.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
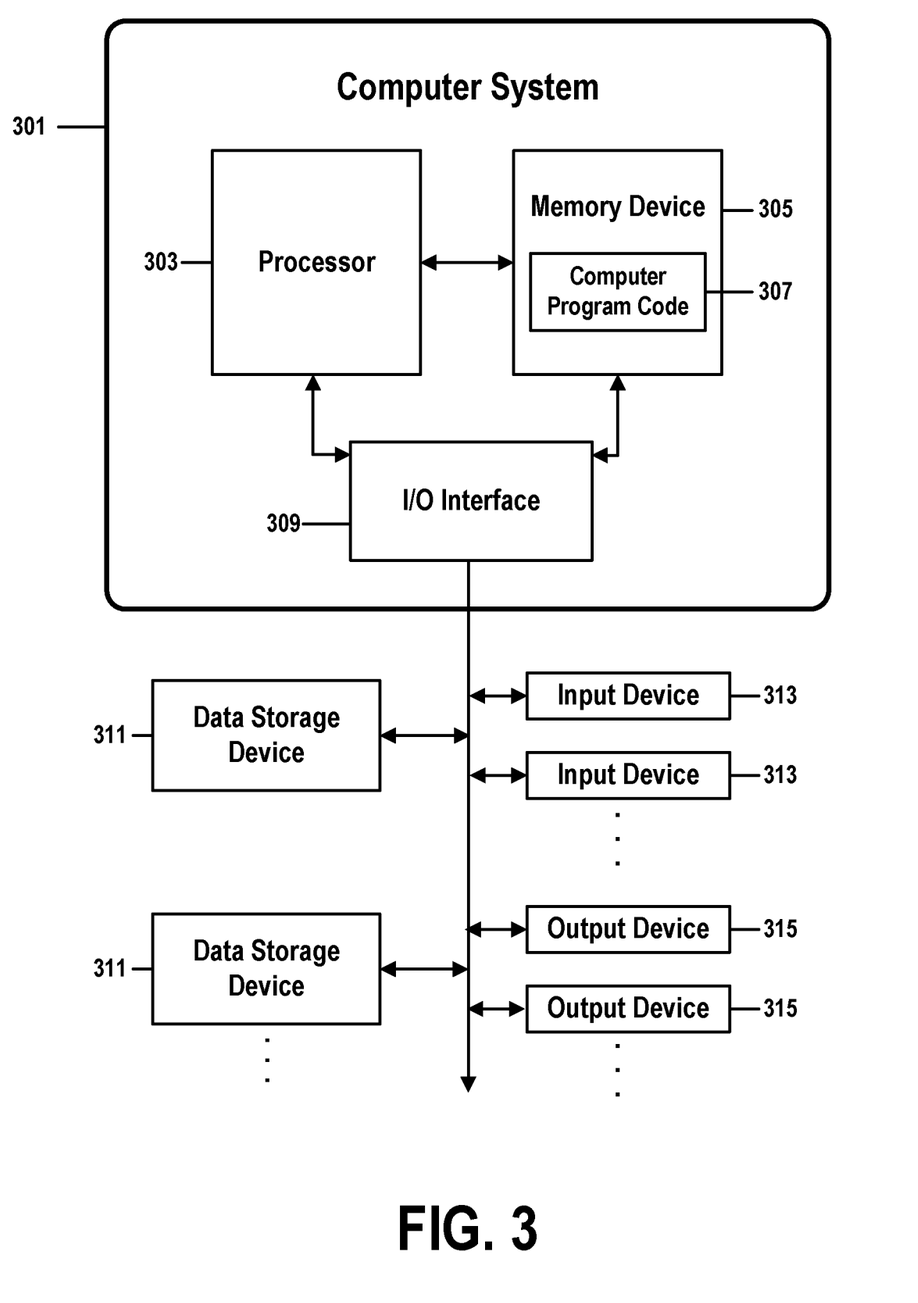
FIG. 3 shows the structure of a computer system and computer program code that may be used to implement a method for access-plan-based querying for federated database-management systems in accordance with embodiments of the present invention.

FIG. 3 shows a structure of a computer system and computer program code that may be used to implement a method for access-plan-based querying for federated database-management systems in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for access-plan-based querying for federated database-management systems in accordance with embodiments of the present invention, and may implement other embodiments described in this specification, including the methods illustrated in FIGS. 1-6. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware, or may be accessed by processor 303 directly from such firmware, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for access-plan-based querying for federated database-management systems.

Any of the components of the present invention could be created, integrated, hosted, maintained, deployed, managed, serviced, supported, etc. by a service provider who offers to facilitate a method for access-plan-based querying for federated database-management systems. Thus the present invention discloses a process for deploying or integrating computing infrastructure, comprising integrating computer-readable code into the computer system 301, wherein the code in combination with the computer system 301 is capable of performing a method for access-plan-based querying for federated database-management systems.

One or more data storage devices 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for access-plan-based querying for federated database-management systems may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for access-plan-based querying for federated database-management systems is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

FIG. 4 shows the workflow by which a legacy federated database-management system processes a query or other type of data-access request. FIG. 4 shows items 400a-450 and 4000-4100.

When a user 400a or upstream system 400b submits a query or other type of data-access request to the host user interface 405 of a legacy FDBMS's federated host database-management system 4000, the query is forwarded to a parser module 410 of federated host 4000, a rewriter module 415 of host 4000, and an optimizer module 420 of host 4000. As described in FIG. 6, these modules perform a series of operations that translate the input query into a database access-plan.

The access plan is then forwarded to a translator module 425 that generates a set of remote subqueries or access subrequests 430. Each of these subrequests is that portion of the original input request, submitted by a user 400a or system 400*b*, that requests access to a corresponding remote database 4100 comprised by the federated database.

FIGS. 4 and 5 each show only one instance of a remote database 4100 for purposes of clarity. In an actual embodiment of the system of FIG. 0.4, translator 425 may generate many remote-access subrequests 430, each of which requests access to data stored in a distinct remote database 450 of remote database-management system 4100.

For example, if a user 400*a* submits an SQL query that requires access to remote databases DB_001, DB_002, and DB_003, translator 425 would divide the access plan produced by optimizer 420 into three subplans, each of which accesses data stored in, respectively, DB_001, DB_002, or DB_003. The legacy federated host 4000 would than transmit each of these plans to its corresponding DB_001, DB_002, or DB_003 instance of remote database 450 of a corresponding instance of remote DBMS 4100.

In each case, each remote access subrequest is then processed by parser 435, rewriter 440, and optimizer 445, each of which performs an operation on subrequest 430 similar to the operation performed on the original query by, respectively, parser 410, rewriter 415, and optimizer 420 of federated host 4000. The result is a data-access subplan that directs remote database 450 how to service subrequest 430

FIG. 5 shows the workflow by which an improved federated database-management system processes a query or other type of data-access request, in accordance with embodiments of the present invention. FIG. 5 shows items 400*a*-425, 450, 525-530, and 5000-5100. Items labeled with numbers identical to those labeling items comprised by FIG. 4 are identical in form and function to correspondingly numbered items in FIG. 4.

Like the legacy federated host DBMS 4000 and remote DBMSs 4100 of FIG. 4, the improved FDBMS of FIG. 5 comprises a federated host DBMS 5000, which appears to users to be a single, integrated database, but which is composed of a set of distinct remote databases 5100. When a user 400*a* or upstream system 400*b* submits an input query or other type of data-access request to host user interface 405 of host DBMS 5000, the query is passed through the host 5000's parser 410, rewriter 415, and optimizer 420 modules, which translate the entire input query into a database access plan for the entire federated database.

The access plan is divided into a set of subplans 525, each of which comprises those steps of the input query that access data stored on one of the remote DBMSs 5100. Each subplan 525 is forwarded to its corresponding remote DBMS 5100, where the subplan 525 is used to direct the corresponding remote DBMS 5100 how to perform those portions of the original input that access data stored in the corresponding remote database 450.

As with FIG. 4's remote DBMS 4100, FIG. 5 shows only one instance of remote database 5100 for purposes of clarity. In an actual embodiment of the improved FDBMS of FIG. 5, optimizer 420 may generate many remote-access subplans 525, each of which requests access to data stored in a distinct remote database 450 of a distinct remote DBMS 5100.

In some embodiments, a remote database 450 may require an access-plan translation engine 530 to translate a subplan 525 into a format or data structure specific to that remote database 450. In one example, consider a federated database comprised of three remote databases 450, each of which is implemented on a different platform. The first database of these remote databases 450 normally parses, rewrites, and optimizes incoming queries into an access plan formatted as a B-tree; the second remote database 450 generates a different type of hierarchical access-plan, but understands access plans formatted into any type of hierarchical structure (including B-trees); and the third remote database 450 can only understand queries formatted into a proprietary compact-binary serial form. If optimizer 420, by default, generates subplans that conform to the B-tree convention, an instance of translation engine 530 is required to translate the subplan created for the third remote database 450 into the required proprietary binary form.

Although not shown in FIG. 5, this access-plan translation functionality may be incorporated into host DBMS 5000 as a single global access-plan translation engine 530, or may be implemented as a single global extrinsic module or service that may be called by host DBMS 5000. In such embodiments, each subplan 525 is, prior to being transmitted, generated in or translated into a format that is compatible with the subplan 525's corresponding target remote database 450.

In other embodiments, each remote DBMS 5100 either incorporates its own translation engine 530 or requests translation services from an extrinsic translation service or module 530. In these embodiments, host DBMS 5000 transmits subplans 525 in a default, common-denominator, or generic format that, if necessary, is translated by each remote DBMS 5100 into a database-specific format.

Like the legacy FDBMS of FIG. 4, the query procedure of improved FDBMS concludes with each remote DBMS 5100 executing the instructions comprised by the received corresponding subplan 525. The results of each query operation are then returned to host DBMS 5000, where host DBMS 5000 aggregates the results into a complete response to the original input query.

FIG. 6 is a flow chart that illustrates the steps of a method for access-plan-based querying for federated database-management systems in accordance with embodiments of the present invention. FIG. 6 contains steps 600-635.

In step 600, the host DBMS 5000 of improved federated DBMS system receives notice of a request to access data stored in the federated database that is managed by the federated DBMS system. This data-access request may have been received from a human user 400*a*, from an automated software utility 400*b* or maintenance tool 400*b*, or from an upstream or external software application 400*b*. The data-access request may take any form that is compatible with the FDMS's host DBMS input interface 405, such as, in certain embodiments, an SQL query or a system call generated by an API (application programming interface).

A federated database is composed of multiple, distinct databases 450 that may be scattered across different sites. The FDMS host input interface 405, however, hides this internal structure from requestors 400*a* and 400*b*, presenting the federated database as a single integrated database. Therefore, the user 400*a* or system 400*b* that submits the data-access request is not aware that the data-access request may seek to access data stored on one or more remote databases 450.

In step 605, FDBMS host 5000 subjects the received input request to a series of operations that transform the request into an optimized data-access plan. These operations are similar to those performed to many legacy database-management systems, and include:

i) parser 410 parses the input request into tokens that represent the fundamental functions, logic, and data entities comprised by the request;

ii) rewriter 415 streamlines the compact structure produced by parser 410 by removing redundant or inefficient operations; for example, if the input request contains two SQL statements that both require retrieving the same data from the same database table, the rewriter 415 in this step might delete one of the redundant statements; and iii) optimizer 420 translates the revised output of rewriter 415 into a data-access plan. This plan contains optimized instructions that specify exactly which steps should be taken to most efficiently perform the functions requested by the input request. For example, if the input request contains a JOIN command that reads data from five columns of two database tables, the data-access plan would specify the order in which each column should be retrieved in order to reduce the total number of database accesses.

In step 610, optimizer 420 determines which instructions of the data-access plan request access to any of the remote databases 450 comprised by the federated database. This step may be performed by any means known in the art, such as by cross-referencing data elements referenced by the access plan with a table or schema that identifies the tables and columns comprised by each remote database 450. In some embodiments, each instruction of the access plan that references a remote data object, possibly including all subcode comprised by a multi-instruction data structure that references a remote data object, may be marked for later reference in step 620.

In embodiments where a remote database 450 is a database cluster, such as an MPP (massively parallel processing) cluster, the federated DBMS may not be able to directly access the individual databases that make up the cluster. Embodiments of the present invention would instead transmit access subplans 525 to the cluster's cluster controller, which manages external access to the individual clustered databases. The federated DBMS would thus treat the entire cluster as a single remote database 450, allowing the cluster controller to transparently route data internally throughout the cluster in order to satisfy requests to access the clustered databases.

Step 615 begins the iterative procedure of steps 615-635. Each iteration of this procedure generates one subplan 525 of the data-access plan and submits it to a corresponding remote database 450.

In some embodiments, this procedure is performed once for each remote database 450 that is accessed by the data-access plan, thus creating a single, distinct subplan 525 for each accessed remote database 450. In other embodiments, however, the procedure is instead repeated once for each independent remote-access function requested by the data-access plan. In this latter case, a data-access plan containing two independent functions that each process a different table of the same remote database 450 would require two iterations of steps 615-635; each of these iterations would spawn a distinct subplan 525 for one of the two independent functions. In this example, the first alternative would thus generate a single subplan 525 that includes all of the access plan's instructions comprised by either of the two independent functions, while the second alternative's two subplans 525 would each include only those instructions required to service one of the two independent requests. The present invention is flexible enough to accommodate either method of dividing the access plan into subplans 525, as preferred by an implementer.

In step 620, optimizer 420 (or, if desired by an implementer, another module of host FDMS 5000) generates a data-access subplan 525 in accordance with either of the two alternatives noted in the above description of step 615. That is, a subplan 525 may be generated by extracting all instructions from the access plan that attempt to access the remote database 450 being processed by the current iteration of steps 615-635; or the subplan 525 may be generated by extracting all instructions from the access plan that perform a particular function or logically coherent operation that accesses the current remote database 450.

The subplan 525 may be generated by any means known in the art, such as by simply partitioning instructions comprised by the data-access plan into mutually exclusive subsets, each of which contain instructions that access a particular remote database 450 or perform a logically distinct data-access operation. Such partitioning may be performed as a function of the actions of step 610, which identified statements or instructions of the data-access plan that access remote databases 450.

In optional step 625, federated host DBMS 5000 determines whether the subplan 525 generated in step 620 is compatible with the remote database 450 to which the subplan 525 will be submitted. If remote database 450 is able to understand the format, language, data structures, or other characteristics of the subplan 525, then the method of FIG. 6 continues with step 635. If remote database 450 cannot understand the subplan 525 in its present form, step 630 is performed prior to performing step 635.

Step 630 is performed if the federated host DBMS 5000 determines in step 625 that the subplan 525 is in a format that is not supported by remote database 450. In this step, a component of the improved federated DBMS translates the subplan into a format that can be submitted directly to the remote database 450.

As described in FIG. 5, this step may be performed by optimizer 420 or by an access-plan translation engine 530, comprised by or accessible to, host DBMS 5000 prior to transmitting the subplan 525 to remote DBMS 5100. This method allows remote DBMS 5100 to process subplan 525 in a conventional manner.

In other cases, host DBMS 5000 may submit each subplan to its corresponding remote DBMS 5100 in a generic or default format that may require translation before being submitted to remote database 450. Translation would then be performed by an access-plan translation engine 530 configured as a component of remote DBMS 5100 (as shown in FIG. 5) or by a functionally similar, extrinsic translation-engine module or service 530. In either case, at the conclusion of step 630, remote DBMS 5100 will have received a data-access subplan 525 in a form that is compatible with remote DBMS 5100, and that subplan 525 will contain instructions that direct remote database 450 to perform data-access tasks requested by the original input request received in step 600.

In step 635, host DBMS 5000 submits subplan 525 to remote database 450, which performs the specific operations enumerated by the subplan 525, and returns any results. Unlike legacy federated database systems like those shown in FIG. 4, no additional parsing, rewriting, or optimizing of an input query or data-access request is necessary. And, other than a relatively minor, optional translation of generic subplan 525 into a database-specific format, no other translation tasks are required in order to complete the requested data-access operations. The results are then returned either directly to the requestor that submitted the input request, or to the federated host DBMS 5000, which then forwards the results to the requestor.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A federated database-management system comprising a processor, a memory coupled to the processor, and a computer-readable hardware storage device coupled to the processor, the storage device containing program code configured to be run by the processor via the memory to implement a method for access-plan-based querying for federated database-management systems, the method comprising:

identifying a set of data-access requests that each requires access to at least one data object stored on at least one remote relational database of the federated database,
      where the federated database comprises a federated host user interface that makes incompatible remote databases of the federated database appear to be a single database to users who access the federated database through the federated host user interface;
   processing the data-access request into an optimal data-access plan that contains instructions for performing database operations required to produce results requested by the data-access request;
   extracting from the data-access plan a set of subplans,
      where each subplan requests a subset of the requested results and contains a distinct subset of database instructions,
      where extracting a first subplan of the set of subplans comprises rewriting one or more instructions of the data-access plan into a format capable of retrieving, from a first table of a first database of the remote databases, a first subset of the requested results,
      where the first table is organized into a first data structure defined by a first schema of the first database,
      where the first data structure is distinct from a second data structure of a second table defined by a second schema of a second database of the remote databases,
      where the first table and the second table both store at least one common data item needed to return the first subset,
      where the rewriting is performed, at the request of the federated host, by a remote network service available to the federated host, and
      where each distinct subset of instructions consists of a plurality of instructions for performing a same class of logically distinct data-access operations on a same database of the at least one remote databases of the federated database;
   transmitting to a first remote database, of the federated database, those subplans, of the set of subplans, that consist of instructions for performing the logically distinct data-access operation on a data object stored in the first remote database; and
   receiving from the first remote database all results produced by the first remote database's performance of the subplans transmitted to the first remote database.

2. The system of claim 1, where the processing is an ordered sequence of steps that comprise:
   parsing the data-access request into tokens that represent data and logic comprised by each statement of the data-access request;
   rewriting the output of the parsing to remove redundancies and inefficiencies; and
   optimizing, prior to the transmitting, the rewritten output of the parsing into the optimal data-access plan.

3. The system of claim 1, where the data-access request is a SQL (Structured Query Language) query.

4. The system of claim 1,
   where the first remote database is a database cluster,
   where the set of subplans are transmitted, prior to the rewriting, to a cluster controller of the database cluster,
   where the cluster controller manages access to each clustered database of the database cluster,
   where the processor performs the rewriting, after the transmitting, on each subplan, of the set of subplans, that is not in a format required by a corresponding database of the database cluster, and
   where the results are received from the cluster controller.

5. A method for access-plan-based querying for federated database-management systems, the method comprising:

identifying a set of data-access requests that each requires access to at least one data object stored on at least one remote relational database of the federated database,
      where the federated database comprises a federated host user interface that makes incompatible remote databases of the federated database appear to be a single database to users who access the federated database through the federated host user interface;
   processing the data-access request into an optimal data-access plan that contains instructions for performing database operations required to produce results requested by the data-access request;
   extracting from the data-access plan a set of subplans,
      where each subplan requests a subset of the requested results,
      where extracting a first subplan of the set of subplans comprises rewriting one or more instructions of the data-access plan into a format capable of retrieving, from a first table of a first database of the remote databases, a first subset of the requested results,
      where the first table is organized into a first data structure defined by a first schema of the first database,
      where the first data structure is distinct from a second data structure of a second table defined by a second schema of a second database of the remote databases,
      where the first table and the second table both store at least one common data item needed to return the first subset,
      where the rewriting is performed, at the request of the federated host, by a remote network service available to the federated host, and
      where each distinct subset of instructions consists of a plurality of instructions for performing a same class of logically distinct data-access operations on a same database of the at least one remote databases of the federated database;
   transmitting to a first remote database, of the federated database, those subplans, of the set of subplans, that consist of instructions for performing the logically distinct data-access operation on a data object stored in the first remote database; and
   receiving from the first remote database all results produced by the first remote database's performance of the subplans transmitted to the first remote database.

6. The method of claim 5, where the processing is an ordered sequence of steps that comprise:

parsing the data-access request into tokens that represent data and logic comprised by each statement of the data-access request;

rewriting the output of the parsing to remove redundancies and inefficiencies; and optimizing, prior to the transmitting, the rewritten output of the parsing into the optimal data-access plan.

7. The method of claim 6, where the first remote database is a database cluster, where the set of subplans are transmitted, prior to the rewriting, to a cluster controller of the database cluster, where the cluster controller manages access to each clustered database of the database cluster, where the processor performs the rewriting, after the transmitting, on each subplan, of the set of subplans, that is not in a format required by a corresponding database of the database cluster, and where the results are received from the cluster controller.

8. The method of claim 5, where the data-access request is a SQL (Structured Query Language) query.

9. The method of claim 5, further comprising providing at least one support service for at least one of creating, integrating, hosting, maintaining, and deploying computer-readable program code in the computer system, where the computer-readable program code in combination with the computer system is configured to implement the identifying, the processing, the extracting, the transmitting, and the receiving.

10. A computer program product, comprising a first non-transitory computer-readable hardware storage device having a computer-readable program code stored therein, the program code configured to be executed by a federated database-management system comprising a processor, a memory coupled to the processor, and a second non-transitory computer-readable hardware storage device coupled to the processor, to implement a method for access-plan-based querying for federated database-management systems, the method comprising:

identifying a set of data-access requests that each requires access to at least one data object stored on at least one remote relational database of the federated database, where the federated database comprises a federated host user interface that makes incompatible remote databases of the federated database appear to be a single database to users who access the federated database through the federated host user interface;

processing the data-access request into an optimal data-access plan that contains instructions for performing database operations required to produce results requested by the data-access request;

extracting from the data-access plan a set of subplans, where each subplan requests a subset of the requested results, where extracting a first subplan of the set of subplans comprises rewriting one or more instructions of the data-access plan into a format capable of retrieving, from a first table of a first database of the remote databases, a first subset of the requested results, where the first table is organized into a first data structure defined by a first schema of the first database, where the first data structure is distinct from a second data structure of a second table defined by a second schema of a second database of the remote databases, where the first table and the second table both store at least one common data item needed to return the first subset, where the rewriting is performed, at the request of the federated host, by a remote network service available to the federated host, and where each distinct subset of instructions consists of a plurality of instructions for performing a same class of logically distinct data-access operations on a same database of the at least one remote databases of the federated database;

the processor transmitting to a first remote database, of the federated database, those subplans, of the set of subplans, that consist of instructions for performing the logically distinct data-access operation on a data object stored in the first remote database; and the processor receiving from the first remote database all results produced by the first remote database's performance of the subplans transmitted to the first remote database.

11. The computer program product of claim 10, where the processing is an ordered sequence of steps that comprise:

parsing the data-access request into tokens that represent data and logic comprised by each statement of the data-access request;

rewriting the output of the parsing to remove redundancies and inefficiencies; and optimizing, prior to the transmitting, the rewritten output of the parsing into the optimal data-access plan.

12. The computer program product of claim 11, where the first remote database is a database cluster, where the set of subplans are transmitted, prior to the rewriting, to a cluster controller of the database cluster, where the cluster controller manages access to each clustered database of the database cluster, where the processor performs the rewriting, after the transmitting, on each subplan, of the set of subplans, that is not in a format required by a corresponding database of the database cluster, and where the results are received from the cluster controller.

13. The computer program product of claim 10, where the data-access request is a SQL (Structured Query Language) query.

* * * * *